United States Patent
Nazari

(10) Patent No.: US 12,424,624 B2
(45) Date of Patent: Sep. 23, 2025

(54) SILVER-DOPED SULFUR CATHODE MATERIAL FOR RECHARGEABLE LITHIUM BATTERY

(71) Applicant: II-VI Delaware, Inc., Wilmington, DE (US)

(72) Inventor: Ghazaleh Nazari, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 686 days.

(21) Appl. No.: 17/658,533

(22) Filed: Apr. 8, 2022

(65) Prior Publication Data

US 2023/0327108 A1      Oct. 12, 2023

(51) Int. Cl.
*H01M 4/58*      (2010.01)
*H01M 4/02*      (2006.01)
*H01M 10/0525*   (2010.01)

(52) U.S. Cl.
CPC ....... *H01M 4/5815* (2013.01); *H01M 4/5825* (2013.01); *H01M 10/0525* (2013.01); *H01M 2004/028* (2013.01)

(58) Field of Classification Search
CPC .. H01M 10/0525; H01M 4/58; H01M 4/5815; H01M 4/5825
See application file for complete search history.

(56) References Cited

U.S. PATENT DOCUMENTS

| | | |
|---|---|---|
| 8,795,612 B2 | 8/2014 | Dixon et al. |
| 11,075,400 B2 | 7/2021 | Koh et al. |
| 11,145,859 B2 | 10/2021 | Hwang et al. |
| 11,201,331 B2 | 12/2021 | Chi et al. |
| 11,239,465 B2 | 2/2022 | Lee et al. |
| 11,251,433 B2 | 2/2022 | Dai et al. |
| 2008/0277630 A1* | 11/2008 | Kiyoshima ............ A61K 8/19 252/514 |

FOREIGN PATENT DOCUMENTS

| | | | |
|---|---|---|---|
| CN | 108063257 A | 5/2018 | |
| CN | 111161904 A * | 5/2020 | ............ H01B 1/20 |
| EP | 3457483 A1 | 3/2019 | |
| JP | 2001110414 A | 4/2001 | |

OTHER PUBLICATIONS

Nazari, Ghazaleh, Enhancing the Kinetics of Pyrite Catalyzed Leaching of Chalcopyrite, Thesis Submitted in Partial Fulfilment of The Requirement for The Degree of Doctor in Philosophy, BASc, The University of British Columbia, 2009, Mar. 2012, 251 pages.

(Continued)

*Primary Examiner* — Karie O'Neill Apicella
(74) *Attorney, Agent, or Firm* — Blank Rome LLP

(57) ABSTRACT

An active cathode material is doped with silver to effectively improve the cathode's electrical conductivity. The active material may be sulfur, and the silver may be in the form of silver, silver sulfide, or both. If desired, the cathode material includes a matrix of conductive nano-particles which include elemental sulfur, silver and or silver sulfide. The present disclosure may be applicable to other battery materials as well, such as, for example, lithium iron phosphate.

18 Claims, 2 Drawing Sheets

(56) References Cited

OTHER PUBLICATIONS

Son, J.T., et al., "Surface-modification of LiMn2O4 with a silver-metal coating", Journal of Power Sources, 2004, 126:182-185.
Chen et al., "Thiourea sole doping reagent approach for controllable N, S co-doping of pre-synthesized large-sized carbon nanospheres as electrocatalyst for oxygen reduction reaction", Carbon 92, 2015, 339-347.
Choi et al., "Nitrogen and Sulfur Co-Doped Porous Carbon Derived from Thiourea and Calcium Citrate for Lithium- Sulfur Batteries", Appl. Sci., 2020, 10:1263, 11 pages.

\* cited by examiner

SILVER-DOPED SULFUR CATHODE MATERIAL FOR RECHARGEABLE LITHIUM BATTERY

BACKGROUND

There is a demand for effective, practical, energy-storage devices. Lithium-sulfur secondary (that is, rechargeable) batteries have been considered for that purpose. A known lithium-sulfur (Li—S) battery has an anode (a negative electrode) containing elemental lithium (Li), a cathode (a positive electrode) containing elemental sulfur (S), and electrolyte and a separator located between the anode and the cathode. When the secondary battery is being charged, lithium ions (Li$^+$) migrate through the electrolyte and the separator from the cathode to the anode. When the battery is discharging, lithium ions migrate through the electrolyte and the separator in the opposite direction, that is, from the anode to the cathode.

Examples of lithium-sulfur batteries are mentioned in U.S. Pat. No. 11,251,433 (Feb. 15, 2022) (Nitrogen-sulfur-carbon nanocomposites and their application as cathode materials in lithium-sulfur batteries), U.S. Pat. No. 11,239,465 (Feb. 1, 2022) (Sulfur-carbon composite, preparation method therefor, and lithium-sulfur battery comprising same), U.S. Pat. No. 11,201,331 (Dec. 14, 2021) (Positive electrode material for lithium-sulfur battery, preparation method therefor, and applications thereof), U.S. Pat. No. 11,145,859 (Oct. 12, 2021) (Metal oxide nanosheet-sulfur nanocomposite and lithium-sulfur battery using the same), and U.S. Pat. No. 11,075,400 (Jul. 27, 2021) (Lithium-sulfur battery).

SUMMARY

The present disclosure relates to a doped material for a cathode of a secondary battery, where the cathode material includes: an active cathode material; and silver, where the amount of active cathode material in the cathode is greater than the amount of silver in the cathode, but the silver effectively improves the electrical conductivity of the cathode.

According to one aspect of the present disclosure, the active cathode material includes sulfur, and the silver is in the form of silver metal (Ag) and/or silver sulfide (Ag$_2$S). If desired, the active cathode material includes elemental sulfur, and the cathode material comprises a matrix of conductive nano-particles which include elemental sulfur, silver and/or silver sulfide. The silver/silver sulfide may improve the electrical conductivity of the cathode.

The present disclosure also relates to a secondary battery in which an active cathode material forms a matrix containing metallic silver and/or silver compounds.

The present disclosure also relates to a method of making a cathode material for a secondary battery.

BRIEF DESCRIPTION OF THE DRAWINGS

Throughout the drawings, like elements are designated by like reference numerals and other characters. The drawings show non-limiting examples for purposes of illustration and explanation of the present disclosure, and are not drawn to scale.

DETAILED DESCRIPTION

Figure 2:
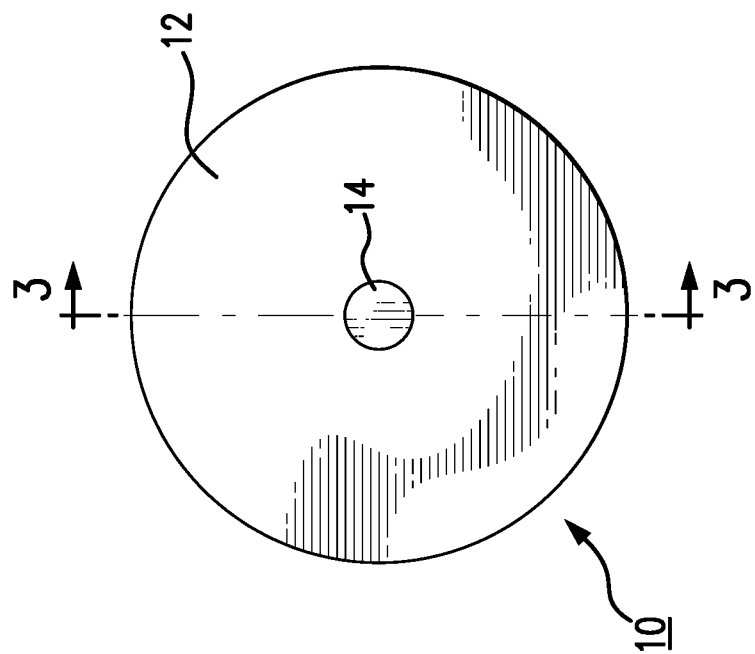
FIG. 2 is a top view of the secondary battery illustrated in FIG. 1.
Figure 1:
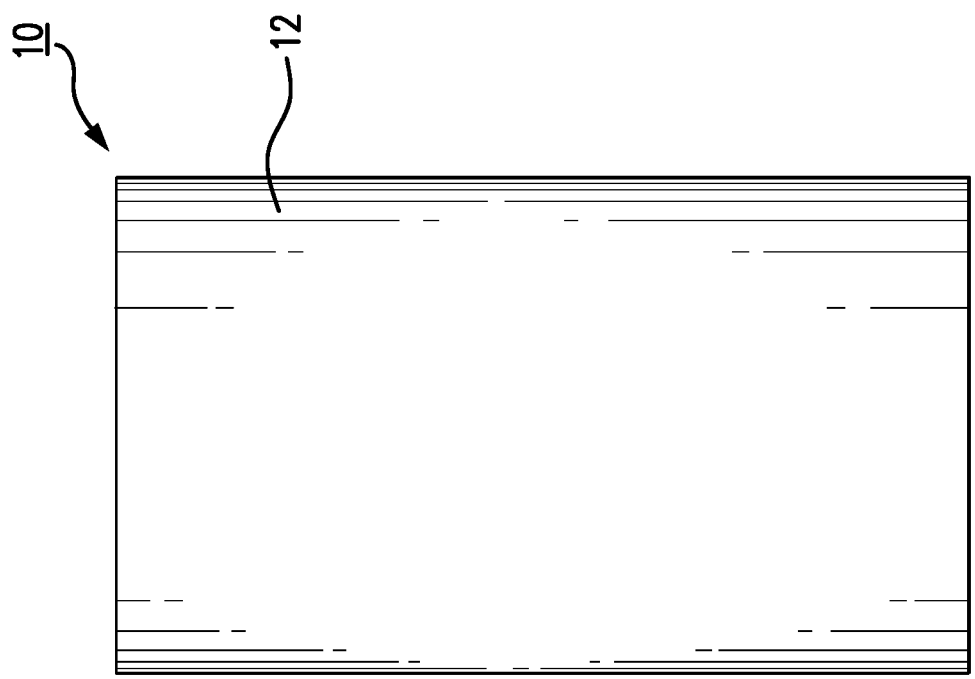
FIG. 1 is a side view of an example of a secondary battery constructed in accordance with the present disclosure.
Figure 3:
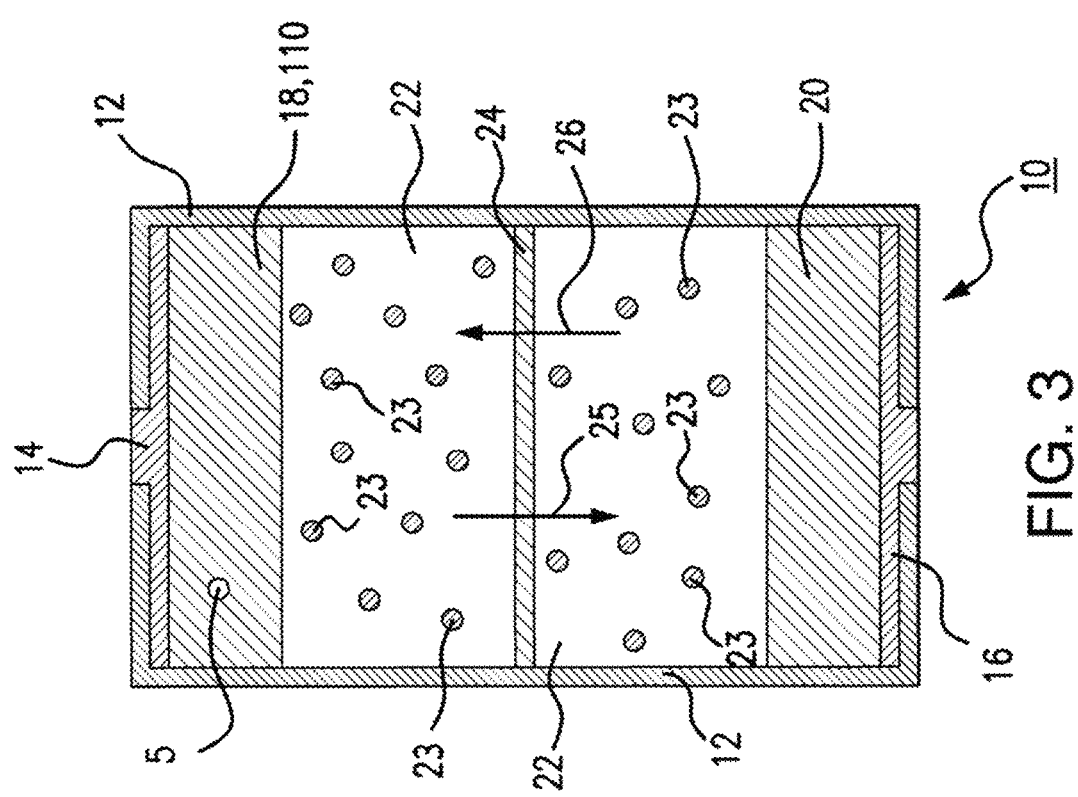
FIG. 3 is a schematic cross-sectional view of the battery illustrated in FIGS. 1 and 2, taken along line 3-3 of FIG. 2.

Referring now to the drawings, an example of a secondary battery 10 (FIG. 1) constructed in accordance with the present disclosure has a cylindrical enclosure 12, a cathode-side conductive collector 14 (FIG. 2), and an anode-side conductive collector 16 (FIG. 3). The present disclosure should not be limited to the configurations shown in the drawings and referred to herein, except to the extent that such features are recited in the accompanying claims. Thus, for example, the present disclosure should not be limited to a device which has a cylindrical enclosure.

The enclosure 12 that is shown by way of example in the drawings may be made of a suitable, durable, non-conductive (electrically insulative) material. The conductive collectors 14, 16 may be made of one or more suitable, conductive materials, such as stainless steel, aluminum, nickel, copper, titanium, platinum, gold, silver, ruthenium, tantalum, niobium, hafnium, zirconium, vanadium, indium, cobalt, tungsten, tin, beryllium, and molybdenum. If desired, the cathode-side collector 14 may include a suitable aluminum foil, and the anode-side collector 16 may include a copper foil. The present disclosure should not be limited, however, to the configurations and materials shown in the drawings and referred to herein, except to the extent that such features are recited in the accompanying claims.

Referring now to FIG. 3, the illustrated battery 10 also has a cathode 18, an anode 20, electrolyte 22, and a separator 24. The cathode 18 is located within the enclosure 12 and contacts the cathode-side conductive collector 14. The cathode 18 includes silver-doped sulfur material, which material may include elemental sulfur (S) (an example of an active cathode material) and silver (Ag) and/or silver sulfide (Ag$_2$S), as described in more detail below.

The anode 20 is also located within the enclosure 12 but contacts the anode-side conductive collector 16. The anode 20 includes one or more suitable active anode materials, such as lithium (Li), natural and artificial graphite, activated carbon, carbon black, conductive additives, lithium titanate (Li$_4$Ti$_5$O$_{12}$, or LTO), surface-functionalized silicon, and powdered graphene.

The electrolyte 22 may include one or more suitable materials such as a non-aqueous liquid electrolyte, an ionic liquid, a solid polymer, and a glass-ceramic electrolyte. If desired, the electrolyte 22 may include salts, solvents, and additives. One or more of the salts may provide a pathway for lithium ions (Li$^+$) 23 to move to and from the cathode 18 and the anode 20. The solvents may include one or more organic liquids for dissolving the salts, and the additives may be in small amounts for specific, desired purposes. In the illustrated example, the electrolyte 22 preferentially allows only the lithium ions 23 (not any electrons) to move to and from the electrodes 18, 20 within the battery 10.

The separator 24 is a semi-permeable barrier located between the battery electrodes 18, 20. The separator 24 may prevent the transmission of electrons through the battery 10, allowing only the lithium ions 23 to pass through internal microscopic openings within the separator 24. The configuration and materials of the separator 24 may be selected for desired physical and electrochemical characteristics. The separator 24 may include, for example, one or more synthetic resins such as polyethylene and polypropylene.

In operation, during a battery-charging process, a suitable charger (not illustrated in the drawings) is electrically connected to the conductive collectors 14, 16 and causes electrons (e⁻) to be conducted from the cathode 18, through the cathode-side collector 14, through one or more suitable wires (not illustrated) located outside of the battery 10, to the anode-side collector 16, and then to the anode 20. At the same time, lithium ions (Li⁺) 23 are transported from the cathode 18, through the electrolyte 22 and the separator 24, and to the anode 20, in the direction schematically indicated by a first arrow 25.

After the battery-charging process, a battery-discharging process may be performed by electrically connecting a suitable load (not illustrated) to the conductive collectors 14, 16, and causing electrons to be conducted from the anode 20, through the anode-side collector 16, through one or more suitable wires (not illustrated) located outside of the battery enclosure 12, to the cathode-side collector 14, and then to the cathode 18. During the battery-discharging process, lithium ions 23 are transported from the anode 20, through the electrolyte 22 and the separator 24, and to the cathode 18, in the direction schematically indicated by a second arrow 26. The battery-charging and battery-discharging processes may then be repeated, many times, in an alternating, cyclical manner.

Figure 4:
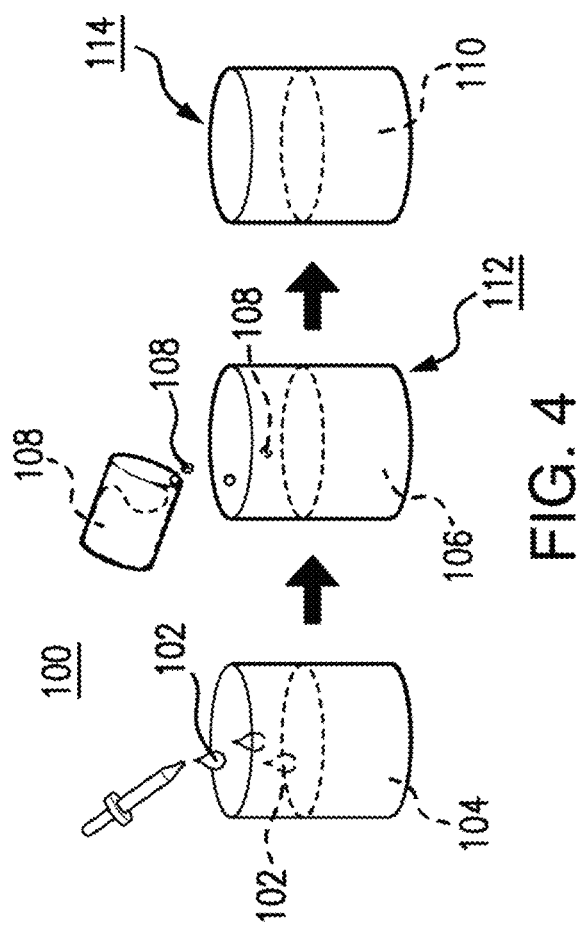
FIG. 4 is a process diagram of an example of a method of making a silver-doped sulfur material for the cathode of the battery illustrated in FIGS. 1-3.

Referring now to FIG. 4, a method of making the silver-doped sulfur material 110 for the cathode 18 may include at least first, second, and third successive steps 100, 112, 114. In the first step 100, a small amount of elemental silver (Ag), in a colloidal silver solution 102, is added to, and mixed into, a suitable, liquid reducing-agent 104 to form a silver (Ag) colloid 106. The suspension medium of the colloidal silver solution may be a suitable liquid such as, for example, water or an acidic solution. The reducing agent 104 may be a suitable liquid such as, for example, sodium borohydride, citrate, and ascorbate or a metal powder such as iron or zinc powder.

Then, in step 112, elemental sulfur (S) 108 is added to, and mixed into, the silver colloid 106. Some of the sulfur 108 may react with the silver in the silver colloid 106 to form silver sulfide ($Ag_2S$) and/or doped in a metallic form (Ag).

Figure 5:
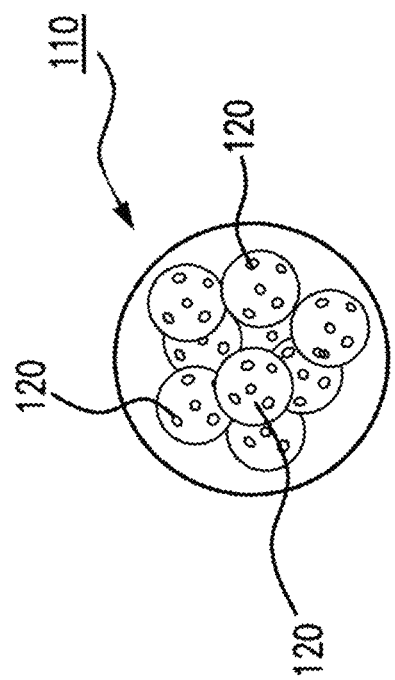
FIG. 5 is an enlarged schematic cross-sectional view of a portion of the cathode of the battery illustrated in FIGS. 1-3, indicated by circle 5 of FIG. 3.

Then, in step 114, the silver-doped sulfur material 110 is allowed or caused to settle out from the mixture created in step 112. The silver-doped sulfur material 110 includes a matrix of elemental sulfur which has been treated with colloidal silver. Conductive nano-particles 120 (FIG. 5) which contain the silver sulfide are formed within the sulfur matrix. The conductivity of the silver-doped sulfur material 110 is much greater than that of the sulfur 108, even though the silver-doped sulfur material 110 contains only a very small amount of silver. If desired, the ratio, by weight, of silver to sulfur in the silver-doped sulfur material 110 may be less than or equal to 100:1,000,000.

The silver colloid 106 may be produced by any suitable method. According to one aspect of the present disclosure, the silver colloid 106 may be synthesized by chemical reduction of a silver salt with a reducing agent such as sodium borohydride, citrate, and ascorbate.

The cathode 18 illustrated in FIG. 3 may be entirely, or at least partially, formed from the silver-doped sulfur material 110. The silver-doped sulfur material 110 is a matrix of (A) conductive nano-particles 120 which may contain a small amount of silver sulfide, (B) a greater amount of elemental sulfur, (C) and/or some elemental silver, and (D) optionally one or more other materials, including, for example, additives and impurities. The amount of sulfur in the cathode 18 is much greater than the amount of silver sulfide in the cathode 18. If desired, the ratio, by weight, of sulfur to silver in the cathode 18 may be greater than or equal to 1,000,000:100.

The silver-doped sulfur material 110 advantageously has high electrical conductivity. There are many reasons to select sulfur as the cathode active material for a secondary battery. Those reasons include the high energy-density and relatively low cost of sulfur. However, the electrical conductivity of sulfur is extremely low. Indeed, sulfur is considered an electrical insulator. Carbon (C) may be added to sulfur as a conductive matrix to allow electron transfer between a cathode and an anode. However, the significant amount of carbon that may be required to sufficiently increase the conductivity of the carbon-sulfur (C—S) mixture leads to an increase in the thickness of the cathode. As the cathode thickness increases, the inability of ions to efficiently diffuse through the thick cathode becomes rate-limiting.

Thus, the battery 10 described by way of example herein, with the illustrated silver-doped sulfur material 110 in the cathode 18, can provide improved performance. The mass (size) of the cathode 18 can be kept small (not increased by the presence of carbon) while maintaining the desired conductivity of the cathode 18. Due to the high conductivity of silver sulfide and silver, a minimal amount of silver can be used to great advantageous effect to provide the electrical conductivity required to allow the desired electron transfer.

Indeed, silver is the most electrically conductive element. Moreover, silver can react with sulfur to form silver sulfide which is stable and will not transfer from the cathode 18 to the anode 20 during charging. Small amounts of silver may suffice to increase the conductivity of sulfur by orders of magnitude. The amount of silver that may be needed to achieve the desired conductivity in a cathode is on the order of parts per million, and therefore may have minimal impact on the cost of producing the battery 10, and also minimal impact on the functionally-required mass (size) of the cathode 18.

In many cases, unsatisfactory battery performance is due to low electrical conductivity of the cathode active material. Although conductive materials such as carbon can be added to sulfur to improve a cathode's conductivity, the attendant increase in weight and thickness of the cathode is disadvantageous. Due to its high conductivity, providing silver/silver sulfide within a matrix of the active cathode material can improve the conductivity of the cathode material to a significant extent without adversely affecting the thickness of the cathode. Unlike carbon, adding a small amount of silver/silver sulfide to a sulfur material for a cathode has little to no adverse impact on diffusion and ion transport.

Additionally, since silver sulfide is a highly stable compound, its presence in the cathode material may avoid at least some of the shuttling effects that are otherwise characteristic of lithium-sulfur secondary batteries.

The present disclosure is not limited to the examples described herein. Among other things, the present disclosure is not necessarily limited to the field of secondary batteries but may also relate to other types of batteries. In other words, except to the extent a feature is recited in the claims, the present disclosure relates to batteries and other devices in addition to the ones described herein.

Moreover, there may be other applications, including applications involving other active cathode materials, where silver can be used to improve the performance of secondary batteries. One such application relates to lithium iron phosphate ($LiFePO_4$, or LFP) batteries which are a type of lithium-ion battery where the cathode includes lithium iron phosphate and the anode includes graphitic carbon and a metallic backing. As with sulfur, a drawback of lithium iron phosphate is its low electrical conductivity. Cathode conductivity may be improved by incorporating lithium iron phosphate into a matrix of carbon.

However, incorporating carbon into the lithium iron phosphate cathode increases the thickness of the cathode. As the thickness of the cathode increases, diffusion and transport of ions become limiting factors. Thus, according to the present disclosure, instead of carbon, a lithium iron phosphate cathode may include a small amount of silver to significantly reduce the mass (size) of the cathode while maintaining its conductivity. According to this aspect of the present disclosure, a cathode for a battery which is otherwise like the battery 10 illustrated in FIGS. 1-3 includes a matrix of (A) a small amount of silver, (B) a greater amount of lithium iron phosphate, and (C) optionally one or more other materials, including, for example, additives and impurities.

The invention claimed is:

1. A secondary-battery cathode, wherein the cathode comprises:
   an active cathode material including a matrix of elemental sulfur; and
   conductive nano-particles located within the matrix of elemental sulfur, the conductive nanoparticles containing silver.

2. The cathode of claim 1, wherein the silver is in the form of metallic silver.

3. The cathode of claim 1, wherein the silver is in the form of metallic silver or silver sulfide.

4. The cathode of claim 1, wherein the silver is in the form of metallic silver and silver sulfide.

5. The cathode of claim 1, wherein the cathode further comprises includes lithium iron phosphate.

6. A secondary battery comprising:
   a cathode according to claim 1;
   an anode;
   an electrolyte located between the cathode and the anode; and
   a separator located within the electrolyte for permitting ions to be transported through the electrolyte to and from the cathode and the anode.

7. The battery of claim 6, wherein the silver is in the form of metallic silver.

8. The battery of claim 6, wherein the silver is in the form of metallic silver or silver sulfide.

9. The battery of claim 6, wherein the silver is in the form of metallic silver and silver sulfide.

10. The battery of claim 6, wherein the cathode further comprises lithium iron phosphate.

11. A method of making a secondary battery cathode according to claim 1, the method comprising:
    producing a mixture by mixing elemental sulfur and a silver colloid to obtain the matrix of elemental sulfur with the conductive nano-particles located therein; and
    recovering the matrix of elemental sulfur with the conductive nano-particles located therein from the mixture.

12. The method of claim 11, further comprising producing the silver colloid by mixing a colloidal silver solution and a reducing agent.

13. The method of claim 11, wherein the reducing agent is sodium borohydride, sodium citrate, sodium ascorbate or a metal powder.

14. A method of making a secondary battery, the method comprising: providing, in an enclosure, a cathode according to claim 1, an anode, an electrolyte between the cathode and the anode, and a separator within the electrolyte.

15. The method of claim 13, wherein the reducing agent is a metal powder.

16. The method of claim 15, wherein the metal powder is a zinc powder.

17. The method of claim 15, wherein the metal powder is an iron powder.

18. The cathode of claim 1, wherein the cathode has a sulfur to silver weight ratio of greater than or equal to 1,000,000:100.

* * * * *